(12) United States Patent
Szwabowski et al.

(10) Patent No.: US 9,421,979 B2
(45) Date of Patent: Aug. 23, 2016

(54) ROAD CHARACTERISTIC PREDICTION

(71) Applicant: Ford Global Technologies, LLC, Dearborn, MI (US)

(72) Inventors: Steven Joseph Szwabowski, Northville, MI (US); Anthony Mario D'Amato, Canton, MI (US); Dimitar Petrov Filev, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 14/056,761

(22) Filed: Oct. 17, 2013

(65) Prior Publication Data

US 2015/0112547 A1   Apr. 23, 2015

(51) Int. Cl.
*B60W 40/00* (2006.01)
*B60W 40/06* (2012.01)
*B60W 40/072* (2012.01)
*B60W 40/076* (2012.01)
*B60W 30/14* (2006.01)

(52) U.S. Cl.
CPC ............ *B60W 40/06* (2013.01); *B60W 40/072* (2013.01); *B60W 40/076* (2013.01); *B60W 30/143* (2013.01); *B60W 2550/12* (2013.01); *B60W 2550/142* (2013.01); *B60W 2550/146* (2013.01); *B60W 2550/147* (2013.01)

(58) Field of Classification Search
CPC ...... B60K 37/06; B60K 35/00; G01C 21/26; B60R 16/0315; B60R 16/0231
USPC .................... 701/1, 117, 123; 73/9
See application file for complete search history.

(56) References Cited

U.S. PATENT DOCUMENTS

| | | | |
|---|---|---|---|
| 6,058,340 A * | 5/2000 | Uchiyama et al. | ............. 701/37 |
| 6,300,865 B1 | 10/2001 | Fechner et al. | |
| 6,807,473 B1 | 10/2004 | Tran | |
| 7,383,154 B2 | 6/2008 | Tate, Jr. | |
| 7,706,965 B2 | 4/2010 | Downs et al. | |
| 7,813,870 B2 | 10/2010 | Downs et al. | |

(Continued)

FOREIGN PATENT DOCUMENTS

WO    WO 9942971 A1    8/1999

OTHER PUBLICATIONS

Bohus et al., "Autoregressive Models and its Possibilities for Modelling of Stochastic Longitudinal Unevenness of Road Surfaces", 10 pages, http://pernerscontacts.upce.cz/09_2008/Leitner.pdf.

(Continued)

*Primary Examiner* — Jelani Smith
(74) *Attorney, Agent, or Firm* — Frank MacKenzie; Bejin Bieneman PLC (57) ABSTRACT

A vehicle system includes at least one sensor that collects infrastructure information in real time and outputs sensor signals representing the collected infrastructure information. A processing device processes the sensor signals, predicts a future road characteristic based on the infrastructure information, and controls at least one vehicle subsystem in accordance with the predicted future road characteristic. A method includes receiving infrastructure information collected in real time, processing the infrastructure information, predicting a future road characteristic based on the infrastructure information, and controlling at least one vehicle subsystem in accordance with the predicted future road characteristic.

18 Claims, 4 Drawing Sheets

(56) References Cited

U.S. PATENT DOCUMENTS

| | | |
|---|---|---|
| 8,165,797 B2 | 4/2012 | Sawamoto et al. |
| 8,280,601 B2 | 10/2012 | Huang et al. |
| 8,306,672 B2 | 11/2012 | Nickolaou |
| 8,306,712 B2 | 11/2012 | Deng et al. |
| 2008/0071465 A1* | 3/2008 | Chapman et al. . G01C 21/3691 701/117 |
| 2009/0312943 A1* | 12/2009 | Kelly et al. ............ G01C 21/26 701/465 |
| 2010/0063715 A1 | 3/2010 | Wynter et al. |
| 2010/0100360 A1 | 4/2010 | Deng et al. |
| 2013/0035839 A1* | 2/2013 | Otanez et al. ................. 701/102 |
| 2014/0036842 A1* | 2/2014 | Pajukoski ............. H04L 1/0025 370/329 |
| 2014/0122045 A1* | 5/2014 | Mewes et al. ...... G06F 17/5009 703/6 |

OTHER PUBLICATIONS

Seongmoon et al., "Optimal vehicle routing with real-time traffic information", IEEE Explore Digital Library, publication date Jun. 6, 2005, http://ieeexplore.ieee.org/xpl/articleDetails.jsp?arnumber=1438386.

Non-Final Office Action in co-pending U.S. Appl. No. 14/056,772 dated Dec. 15, 2014.

* cited by examiner

ROAD CHARACTERISTIC PREDICTION

CROSS-REFERENCE TO RELATED APPLICATION

This application is related to U.S. patent application Ser. No. 14/056,773 filed Oct. 17, 2013 entitled "Road Characteristic Prediction", the complete contents of which is hereby incorporated herein by reference in its entirety.

BACKGROUND

Some vehicles operate in different modes depending on various circumstances. For example, traction control systems may operate differently on dry, relatively flat roads than on wet, hilly roads. Some vehicles can automatically make adjustments in response to a change in road conditions.

DETAILED DESCRIPTION

An exemplary vehicle system includes at least one sensor that collects infrastructure information in real time and outputs sensor signals representing the collected infrastructure information. A processing device processes the sensor signals, predicts a future road characteristic based on the infrastructure information, and controls at least one vehicle subsystem in accordance with the predicted future road characteristic. In some implementations, the processing device evaluates a prediction error and adjusts a prediction horizon until the prediction error is within a predetermined accuracy range.

Figure 1:
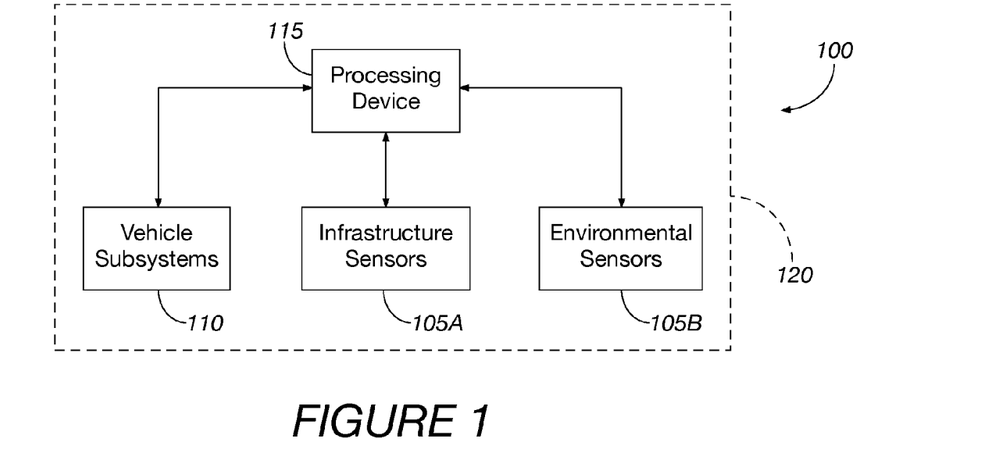
FIG. 1 illustrates an exemplary vehicle system for predicting changes in road characteristics.

FIG. 1 illustrates an exemplary vehicle system 100 for predicting road characteristics. The system may take many different forms and include multiple and/or alternate components and facilities. While an exemplary system is shown, the exemplary components illustrated are not intended to be limiting. Indeed, additional or alternative components and/or implementations may be used.

As illustrated in FIG. 1, the system 100 includes sensors (collectively, 105), including infrastructure sensors 105A and environmental sensors 105B, vehicle subsystems 110, and a processing device 115. The system 100 may be incorporated into any passenger or commercial vehicle 120 such as a car, a truck, sport-utility vehicle, a bus, train, a boat, or an airplane.

The sensors 105 may include any number of devices configured to generate and output signals that help operate the vehicle 120 according to different road characteristics. For example, the infrastructure sensors 105A may collect infrastructure information and the environmental sensors 105B may collect environmental information. The sensors 105 may be configured to collect infrastructure information and/or environmental information in real time and output signals, also in real time, representing the information collected. Examples of infrastructure sensors 105A may include a radar sensor, a lidar sensor, a camera, an altimeter, a compass, a gyroscope, or the like. Therefore, infrastructure information may include road roughness, road curvature, and road grade. In some possible implementations, the infrastructure information may be received wirelessly from a remote server. Accordingly, another type of infrastructure sensor 105A may include a wireless communication module. Example infrastructure information that may be received through the communication module may include, e.g., road construction guidelines. Examples of environmental sensors 105B may include a sunlight sensor, a rain sensor, a temperature sensor, etc. Environmental information, therefore, may include geological information, climate information, and weather information. One or more of the environmental sensors 105B may include a wireless communication module configured to receive environmental information wirelessly from a remote server. Some sensors 105 may be configured to provide both infrastructure information and environmental information in real time. For example, a Global Positioning System (GPS) sensor may output signals representing, e.g., the altitude of the vehicle 120 as well as geographical information.

The processing device 115 may be configured to process the sensor 105 signals, predict a future road characteristic based on, e.g., the infrastructure information, the environmental information, or both, and control at least one subsystem 110 in accordance with the predicted future road characteristic. Examples of subsystems 110 that can be controlled by the processing device 115 may include a power steering subsystem, a powertrain subsystem, an active noise control subsystem, a traction control subsystem, a stability control subsystem, etc. For example, the processing device 115 may cause, among others, the traction control subsystem and the stability control subsystem to operate differently on flat, dry roads than on hilly, wet roads.

As discussed in greater detail below, the processing device 115 may project future road characteristics by observing road characteristics over a predetermined period of time and counting the frequency of each observed characteristic. The processing device 115 may further apply a weight to each observed characteristic. More recent characteristics may be given a greater weight. That is, the processing device 115 may apply a greater weight to a current road characteristic and a lower weight to a previous road characteristic. In other words, over the predetermined period of time, the first-measured characteristic will be given the lowest weight while the current characteristic (i.e., the characteristic most recently measured) will be given the greatest weight. Counting the frequency of each observed characteristic may include counting the number of times the observed characteristic changes over the predetermined period of time. In this example approach, the processing device 115 may predict future road characteristics based on the number of times the observed characteristic changes over the predetermined period of time.

This implementation may use probabilistic online learning, e.g., Markov models to continuously update information about the future road conditions ahead of the vehicle 120 based on previously measured conditions. The Markov Models of transition probabilities may vary significantly for different drivers, vehicles, and road conditions. In order to guarantee that the Markov Models adequately describe the stochastic process being modeled for a wide range of conditions, drivers, and modes of operation, an on-board estimation of the transition probabilities is described below.

In the conventional Markov chain model the transitional probabilities $p_{ij}=P(w^j=w(t+1)|w^i=w(t))$, where $w^i, w^j W$, are defined through the frequencies, i.e., $p_{ij}=N_{ij}/N_i$ where $N_{ij}$ is the number of cases with $w(t)=w^i$ and $w(t+1)=w^j$ and $N_i$ is the number of cases with $w(t)=w^i$ and $w(t+1)$ belonging to any of the finite number of states J. For a given total number of observations N the transition probabilities can be formally expressed through the average frequencies, i.e., $p_{ij}=(N_{ij}/N)/(N_i/N)$. In the on-line learning version of the Markov chain these average frequencies are replaced by their exponentially weighted counterparts that have higher weights assigned to the most recent observations. Numerically, the process of generating a weighted average alternative to $(N_{ij}/N)$ with exponentially decreasing weights can be accomplished by applying a low pass filter implementing the exponential smoothing algorithm in the time domain:

$$F_{ij,new} \qquad (1)$$

where the constant learning rate $0<\alpha \leq 1$ controls the rate of updating the $F_{ij}$ by assigning a set of exponentially decreasing weights to the older observations. For a constant learning rate $\alpha$ expression (1) recursively generates a vector of positive weights:

$$W=[(1-\alpha)^k \alpha (1-\alpha)^{k-1} \alpha (1-\alpha)^{k-2} \ldots \alpha] \qquad (2)$$

with a unit sum. Vector W delineates a weighted average type aggregating operator with exponentially decreasing weights that are parameterized by the learning rate $\alpha$. Learning rate $\alpha$ defines the memory depth (i.e., the length of the moving window) of the weighted averaging aggregating operator. The memory depth K is approximately reciprocal to the learning rate, i.e., $K \approx 1/\alpha$. Therefore, $F_{ij}$ in (1) represents the weighted average of the individual observations over the weights W. Alternatively, for the weighted version of $(N_i/N)$:

$$F_{i,new}=(1-\alpha)F_{i,old}+\alpha, \text{ if } w(t)=w^i \qquad (3)$$

as representation of the of the weighted average of all the cases with $w(t)=w^i$ and $w(t+1)$ belonging to any of the finite number of states J.

The weighted averages may be calculated over the events belonging to the soft interval $\{t-K+1, t]$ where symbol "$\{$" indicates a soft lower interval limit which includes values with lower indexes than (t-K that have relatively low contribution. Consequently, the exponentially weighted transitional probabilities are obtained from the exponentially weighted averages $$p_{ij}=F_{ij}/F_i. \qquad (4)$$

The definition of the transition probabilities by Equation (4) allows for the continuous adaptation to the changing vehicle 120, road, and traffic conditions, and style of driving. Moreover, by using a vectorized learning, the processing device 115 can fine-tune the process of updating the transition probabilities that are associated with different Markov states. The present and one step-ahead state probability vectors x and x+ are linked through transition probabilities as $$(x^+)^T=x^T P. \qquad (5)$$

For t>1 steps ahead, the Chapman-Kolmogorov equation yields $$(x^{+t})^T=x^T P^t. \qquad (6)$$

In another possible approach, the processing device 115 may make predictions of future road characteristics subject to a prediction error. In this implementation, the processing device 115 may evaluate the prediction error and adjust a prediction horizon until the prediction error is within a predetermined accuracy range. The prediction horizon may include predictions of road characteristics at a number of consecutive locations in the most-likely path of the vehicle 120. Adjusting the prediction horizon may include, iteratively, increasing the prediction horizon (i.e., the number of future road predictions at different locations) until the prediction error exceeds the maximum threshold value and reducing the prediction horizon until the prediction error is below a minimum threshold value. Therefore, increasing the number of locations increases the prediction horizon and reducing the number of locations reduces the prediction horizon. The maximum threshold value and the minimum threshold value may define the predetermined accuracy range. As with the previous approach, the processing device 115 may control one or more vehicle subsystems 110 in accordance with the predicted future road characteristic.

In this approach, let $\gamma(k) \in \mathbb{R}$ be a surrogate for either road curvature, grade, or roughness measurement at time k depending on the problem to be solved, and assume that the surrogate can be modeled as a finite sum of sinusoids, that is $$\gamma(k) = \sum_{i=1}^{e} [A_i \sin(\omega_i k + \phi_i) + B_i \cos(\omega_i k + \phi_i)] \qquad (7)$$

where $A_i$, $B_i$, $\omega_i$, $\phi_i$ are unknown. Then the surrogate propagates by $$\gamma(k+1)=\theta(k)\phi(k) \qquad (8)$$

where $\theta(k) \in \mathbb{R}^{1 \times n}$ is a vector of model parameters, and $$\phi(k) = \begin{bmatrix} \gamma(k) \\ \vdots \\ \gamma(k-n+1) \end{bmatrix} \in \mathbb{R}^n \qquad (9)$$

is a vector of present and past data. Next, let r, a positive integer, be the width of the surrogate prediction horizon. Then the surrogate $\gamma(k+r)$, is obtained by writing Equation (7) in the state space form $$\begin{bmatrix} \gamma(k+1) \\ \vdots \\ \gamma(k-n+2) \end{bmatrix} = A(k) \begin{bmatrix} \gamma(k) \\ \vdots \\ \gamma(k-n+1) \end{bmatrix} \qquad (10)$$

$$\gamma(k) = [1 \; 0 \; \ldots \; 0] \begin{bmatrix} \gamma(k) \\ \vdots \\ \gamma(k-n+1) \end{bmatrix} \qquad (11)$$

where $$A(k) = \begin{bmatrix} \theta(k) \\ A_{12} \end{bmatrix} \in \mathbb{R}^{n \times n} \qquad (12)$$

are the surrogate dynamics, and $$A_{12} = \begin{bmatrix} 1 & 0 & \ldots & 0 \\ 0 & \ddots & \ddots & \vdots \\ 0 & 0 & 1 & 0 \end{bmatrix} \in \mathbb{R}^{(n-1) \times n}. \qquad (13)$$

It follows from Equations (10)-(11) that the surrogate at k+r is $$\gamma(k+r) = [1 \; 0 \; \ldots \; 0] \prod_{i=1}^{r} A(k+i-1) \begin{bmatrix} \gamma(k) \\ \vdots \\ \gamma(k-n+1) \end{bmatrix}. \qquad (14)$$

Next, assume that A(k) evolves slowly over time such that for i=1, ..., r, $$A(k+i) \approx A(k) \quad (15)$$

and Equation (14) can be rewritten as $$\gamma(k+r) \approx [1 \; 0 \; \ldots \; 0] A^r(k) \begin{bmatrix} \gamma(k) \\ \vdots \\ \gamma(k-n+1) \end{bmatrix}. \quad (16)$$

Next, since A(k) is unknown, an estimate of A(k) called Â(k) is used to estimate the surrogate r-steps into the future such that $$\hat{\gamma}(k+r) = [1 \; 0 \; \ldots \; 0] \hat{A}^r(k) \begin{bmatrix} \gamma(k) \\ \vdots \\ \gamma(k-n+1) \end{bmatrix}, \quad (17)$$

where $$\hat{A}(k) = \begin{bmatrix} \hat{\theta}(k) \\ A_{12} \end{bmatrix} \in \mathbb{R}^{n \times n} \quad (18)$$

and $\hat{\theta}(k) \in \mathbb{R}^{1 \times n}$ is an estimate of $\theta(k)$.

The function $\hat{\theta}(k)$ can be computed by formulating the recursive least squares cost function $$J(\hat{\theta}(k)) \triangleq \sum_{i=r+1}^{k} \lambda^{k-i} \|\hat{\theta}(k)\phi(i) - \gamma(i)\|^2 + \quad (19)$$

$$\lambda^k Tr(\hat{\theta}(k) - \hat{\theta}(0)) P^{-1}(0) (\hat{\theta}(k) - \hat{\theta}(0))^T$$

where $P(0) \in \mathbb{R}^{n \times n}$ is positive definite and $\lambda \in (0, 1]$ is the forgetting factor. The minimizer of Equation (19) is $$\hat{\theta}(k) \triangleq \hat{\theta}(k-1) + \beta(k)[\hat{\theta}(k-1)\phi(k-1) - \gamma(k-1)][\phi^T(k-1)P(k-1)\phi(k-1) + \lambda]^{-1} \quad (20)$$

where β(k) is either 0 or 1. When β(k)=1, the model is updated, whereas, when β(k)=0, the model is fixed. P(k) is updated by $$P(k) \triangleq \lambda^{-1} P(k-1) - \beta(k) \lambda^{-1} P(k-1) \phi(k-1) [\phi^T(k-1) P(k-1) \phi(k-1) + \lambda]^{-1} \phi^T(k-1) P(k-1) \quad (21)$$

P(0) is initialized to αI, where α>0.

The processing device 115 may be further configured to implement reinforcement learning. Reinforcement learning attempts to solve the problem of choosing a set of state transitions, such that some predefined performance metric is maximized, that is a reward function.

In the context of surrogate prediction, let r(k)=0, ..., m which is the prediction horizon as a function of time k, be the set of allowable states, where m is the maximum allowable horizon size. In some instances, a horizon is chosen so that r is as large as possible. However, as mentioned above, prediction accuracy decreases as r increases. Therefore the reward function may be $$J(k) = \sum_{i=k}^{k+h} \gamma(k) R(r(k), r(k+1), e(k), e(k+1)), \quad (22)$$

where $0 \le \gamma(k) < 1$, is a discount factor, and R(•) is a function of the horizon r and prediction error e, and is user defined to provide the desired balance between horizon size and prediction accuracy. Next, reinforcement learning is used to maximize J(k), and therefore determine the horizon r(k), which results in the desired balance between horizon size and required accuracy.

In general, computing systems and/or devices, such as the processing device 115, may employ any of a number of computer operating systems, including, but by no means limited to, versions and/or varieties of the Ford SYNC® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., and the Android operating system developed by the Open Handset Alliance. Examples of computing devices include, without limitation, a vehicle computer or control unit, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2A:
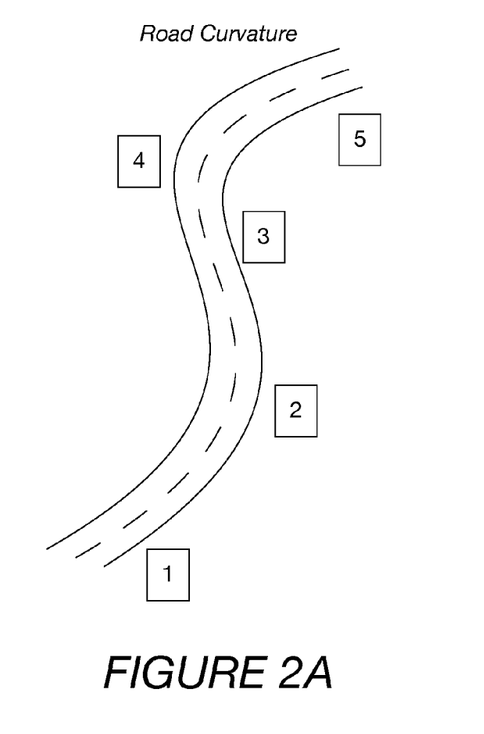
FIGS. 2A-2C illustrate example road characteristics that may be predicted by the vehicle system.
Figure 2B:
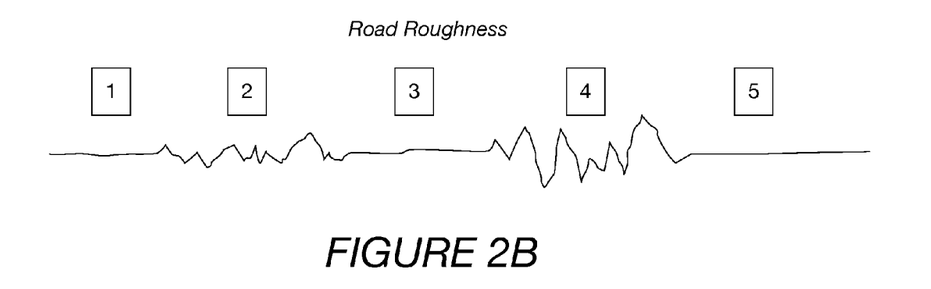
Figure 2C:
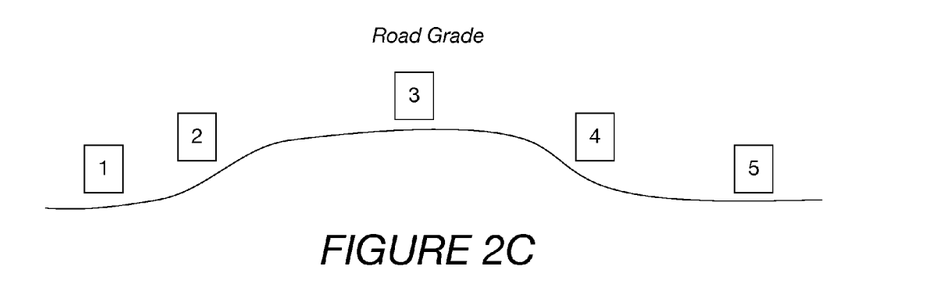

FIGS. 2A-2C illustrate exemplary road characteristics that may be evaluated by the processing device 115. In these FIGS., the processing device 115 collects infrastructure information at a number of locations or road segments to predict future road characteristics. While only five segments are shown for purposes of clarity and simplicity, the processing device 115 may collect infrastructure information at any number of segments.

As shown in FIG. 2A, the processing device 115 may collect road curvature information. The processing device 115 may determine that the curvature is relatively low at segments 1, 3, and 5 and relatively high at segments 2 and 4. Thus, the processing device 115 made predict the road curvature to continue to alternate between high and low curvatures in the path of the vehicle 120 and adjust a mode of operation of one or more subsystems 110 at various times and locations accordingly. The processing device 115 may note the length of each segment (i.e., a distance between locations) to predict where the road curvature is most likely to change. The processing device 115 may further consider the speed of the vehicle 120 to predict when the vehicle 120 will reach the next segment. In implementations where a weight is applied to the road characteristics collected at each segment, and assuming the vehicle 120 is traveling from segment 1 to segment 5, a greater weight may be applied to the characteristic collected at segment 5 (the most recently collected characteristic) and a lower weight may be applied to the characteristic collected at segment 1 (the "oldest" characteristic collected). Intermediate weights (i.e., weights between those applied to segments 1 and 5) may be applied to the characteristics associated with segments 2, 3, and 4.

Referring now to FIG. 2B, the processing device 115 may collect road roughness information. The processing device 115 may determine that the roughness is relatively low at segments 1, 3, and 5 and relatively high at segments 2 and 4. Thus, the processing device 115 made predict the road roughness to continue to alternate between high and low roughness factors in the path of the vehicle 120 and adjust a mode of operation of one or more subsystems 110 at various times and locations accordingly. As discussed above, the processing device 115 may note the length of each segment (i.e., a distance between locations) to predict where the road roughness is most likely to change. The processing device 115 may further consider the speed of the vehicle 120 to predict when the vehicle 120 will reach the next segment. In implementations where a weight is applied to the road characteristics collected at each segment, and assuming the vehicle 120 is traveling from segment 1 to segment 5, a greater weight may be applied to the roughness factor collected at segment 5 (the most recently collected characteristic) and a lower weight may be applied to the roughness factor collected at segment 1 (the "oldest" characteristic collected). Intermediate weights (i.e., weights between those applied to segments 1 and 5) may be applied to the roughness factors associated with segments 2, 3, and 4.

A similar analysis may apply to road grade as shown in FIG. 2C. That is, the processing device 115 may determine that the grade factor is relatively low at segments 1, 3, and 5 and relatively high at segments 2 and 4. Thus, the processing device 115 made predict that the road grade will continue to alternate between high and low grade factors in the path of the vehicle 120 and adjust a mode of operation of one or more subsystems 110 at various times and locations accordingly. As discussed above, the processing device 115 may note the length of each segment (i.e., a distance between locations) to predict where the road grade is most likely to change. The processing device 115 may further consider topography information, which may be available via a GPS sensor or other environmental sensor 105A, when making such predictions. The processing device 115 may consider the speed of the vehicle 120 to predict when the vehicle 120 will reach the next segment. In implementations where a weight is applied to the road characteristics collected at each segment, and assuming the vehicle 120 is traveling from segment 1 to segment 5, a greater weight may be applied to the grade factor collected at segment 5 (the most recently collected characteristic) and a lower weight may be applied to the grade factor collected at segment 1 (the "oldest" characteristic collected). Intermediate weights (i.e., weights between those applied to segments 1 and 5) may be applied to the grade factors associated with segments 2, 3, and 4.

In some instances, the segments may be different lengths. The processing device 115, therefore, may further predict the length of the next segment and control the operation of one or more subsystems 110 accordingly. Moreover, a segment may be so short that the processing device 115 may decide to operate one or more subsystems 110 according to the current characteristics instead of the future or predicted road characteristic. For example, on a road with long segments with high curvature followed by a short, relatively straight segments, the processing device 115 may determine that the best course of action is to keep the subsystems 110 operating in the mode associated with high curvature even while travelling through the segments with relatively low curvature. In other words, the processing device 115 may be configured to ignore certain predictions when controlling the mode of operation of one or more subsystems 110.

Figure 3:
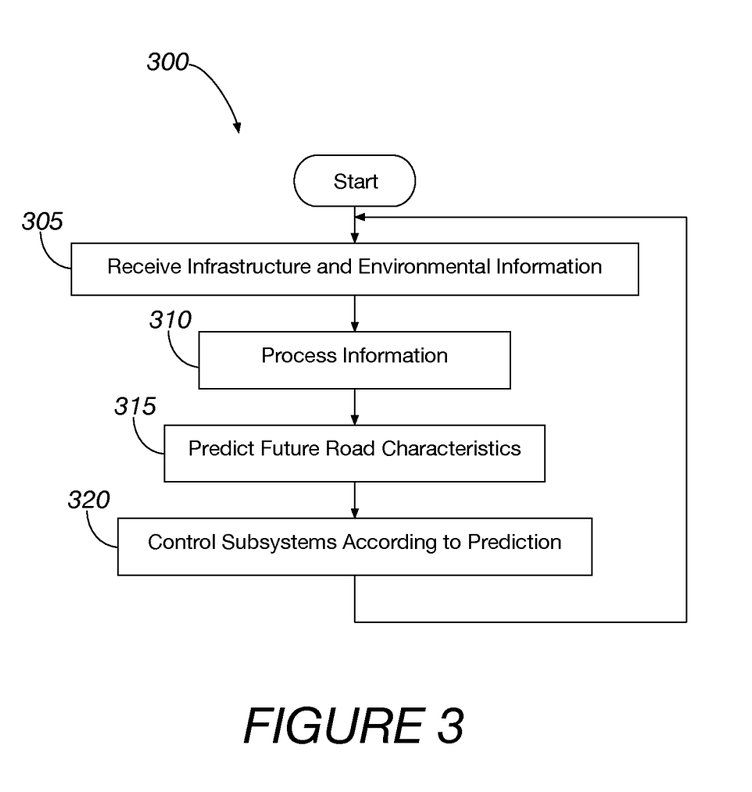
FIG. 3 is a flowchart of one exemplary process that may be implemented by the vehicle system.

FIG. 3 is a flowchart of one exemplary process 300 that may be implemented by the processing device 115 to, e.g., predict future road characteristics.

At block 305, the processing device 115 may receive infrastructure information, environmental information, or both, collected in real time by one or more sensors 105. Infrastructure information may include one or more of road roughness, road curvature, road grade, and road construction guidelines. Examples of environmental information may include geological information, climate information, and weather information.

At block 310, the processing device 115 may process the infrastructure information and/or environmental information received at block 305. Processing the infrastructure information and/or environmental information may include decoding signals received from the infrastructure sensors 105A and/or the environmental sensors 105B, respectively.

At block 315, the processing device 115 may predict future road characteristics based on the infrastructure information and/or the environmental information. In one possible implementation, predicting future road characteristics may include observing at least one of a plurality of road characteristics over predetermined period of time and counting the frequency of each observed characteristic. Counting the frequency of the observed characteristic may include counting the number of times the observed characteristic changes over the predetermined period of time. Accordingly, the future road characteristic may be predicted based on the number of times the observed characteristic changes over the predetermined period of time. Moreover, the processing device 115 may apply different weights to each observed characteristic when making predictions of future road characteristics. As discussed above, a greater weight may be applied to the current road characteristic and a relatively lower weight may be applied to previous road characteristics.

At block 320, the processing device 115 may control at least one subsystem 110 in accordance with the predicted future road characteristic, including ignoring the predicted future road characteristic if the processing device 115 determines that the predicted future road characteristic will only exist for relatively short period of time. The process 300 may return to block 305 after block 320.

Figure 4:
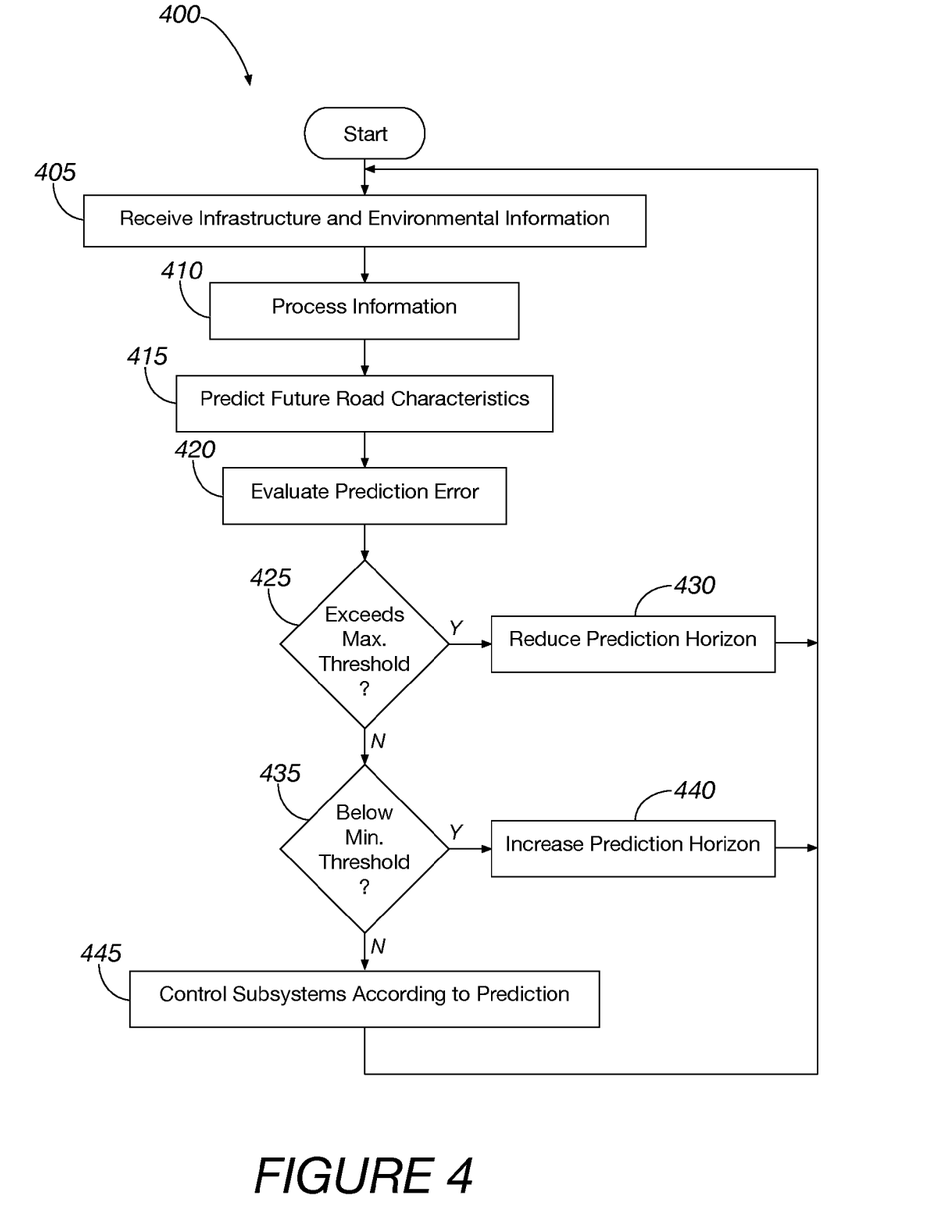
FIG. 4 is a flowchart of another exemplary process that may be implemented by the vehicle system.

FIG. 4 is a flowchart of another exemplary process 400 that may be implemented by the processing device 115 to, e.g., predict future road characteristics.

At block 405, the processing device 115 may receive infrastructure information, environmental information, or both, collected in real time by one or more sensors 105. Infrastructure information may include one or more of road roughness, road curvature, road grade, and road construction guidelines. Examples of environmental information may include geological information, climate information, and weather information.

At block 410, the processing device 115 may process the infrastructure information and/or environmental information received a block 405. Processing the infrastructure information and/or environmental information may include decoding signals received from the infrastructure sensors 105A and/or the environmental sensors 105B, respectively.

At block 415, the processing device 115 may predict future road characteristics based on the infrastructure information and/or the environmental information. The prediction at block 415 may be based on a prediction horizon relative to prediction error. The prediction horizon may include a number of predictions of road characteristics at consecutive locations in the most likely path of the vehicle 120.

At block 420, the processing device 115 may evaluate the prediction error. One way to evaluate the prediction error may include determining the accuracy of previously made predictions. For example, the processing device 115 may compare predicted road characteristics for particular locations to the actual road characteristics at those locations. The prediction error may be different for each location, and the prediction error may increase as the location from the vehicle 120 increases. Accordingly, the processing device 115 may determine the prediction error from the least accurate prediction (i.e., the prediction of the road characteristics at the location farthest from the vehicle 120).

At decision block 425, the processing device 115 may determine whether the prediction exceeds a threshold value. If so, the process 400 and continue at block 430. If the prediction error does not exceed the threshold value, the process 400 may continue at block 435.

At block 430, the processing device 115 may reduce the prediction horizon. One way to reduce the prediction horizon is to reduce the number of predictions made by the processing device 115. For example, the processing device 115 may stop making predictions of the road characteristics at the location or locations farthest from the vehicle 120 since those predictions are most likely to have the highest prediction error. The process 400 may return to block 405 after the prediction horizon is reduced.

At decision block 435, the processing device 115 may determine whether the prediction error is below a minimum value. If the prediction error falls below a minimum value, the process 400 may continue at block 440. If, however, the prediction error is not below the minimum value, the process 400 may continue at block 445.

At block 440, the processing device 115 may increase the prediction horizon. Increasing the prediction horizon may include increasing the number of predictions made by the processing device 115. For example, to increase the prediction horizon the processing device 115 may make predictions of the road characteristics at farther locations than current predictions. The process 400 may return to block 405 after the prediction horizon is increased.

At block 445, the processing device 115 may control at least one subsystem 110 in accordance with the predicted future road characteristic, including ignoring the predicted future road characteristic if the processing device 115 determines that the predicted future road characteristic will only exist for relatively short period of time. The process 400 may return to block 405 after block 445.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising:
    at least one sensor configured to collect infrastructure information in real time and output sensor signals representing the infrastructure information; and
    a processing device configured to process the sensor signals, predict a future road characteristic based on the infrastructure information, and control at least one vehicle subsystem in accordance with the predicted future road characteristic,
    wherein predicting the future road characteristic includes:
        observing at least one of a plurality of road characteristics over a predetermined period of time,
        determining a frequency of occurrence of the at least one of the plurality of road characteristics, and
        predicting the future road characteristic based at least in part on whether the at least one of a plurality of road characteristics is observed at least two times over the predetermined period of time and a predicted duration of the at least one of a plurality of road characteristics.

2. The vehicle system of claim 1, wherein the infrastructure information includes at least one of road roughness, road curvature, road grade, and road construction guidelines.

3. The vehicle system of claim 1, wherein the at least one sensor is configured to collect environmental information.

4. The vehicle system of claim 3, wherein the environmental information includes at least one of geological information, climate information, and weather information.

5. The vehicle system of claim 1, wherein predicting the future road characteristic includes applying a weight to each observed characteristic.

6. The vehicle system of claim 5, the plurality of road characteristics including a current road characteristic and a previous road characteristic, and wherein the weight applied to the current road characteristic is greater than the weight applied to the previous road characteristic.

7. The vehicle system of claim 1, wherein counting the frequency of the observed characteristic includes counting a number of times the observed characteristic changes over the predetermined period of time.

8. The vehicle system of claim 7, wherein the processing device is configured to predict the future road characteristic based at least in part on the number of times the observed characteristic changes over the predetermined period of time.

9. A method comprising:
    receiving infrastructure information collected in real time;
    processing the infrastructure information;
    predicting, via a computing device, a future road characteristic based on the infrastructure information, wherein predicting the future road characteristic includes observing at least one of a plurality of road characteristics over a predetermined period of time, determining a frequency of the occurrence of at least one of the plurality of road characteristics, and predicting the future road characteristic based at least in part on whether the at least one of a plurality of road characteristics is observed at least two times over the predetermined period of time and a predicted duration of the at least one of a plurality of road characteristics; and
    controlling at least one vehicle subsystem in accordance with the predicted future road characteristic.

10. The method of claim 9, wherein the infrastructure information includes at least one of road roughness, road curvature, road grade, and road construction guidelines.

11. The method of claim 9, further comprising receiving environmental information.

12. The method of claim 11, wherein the environmental information includes at least one of geological information, climate information, and weather information.

13. The method of claim 9, wherein predicting the future road characteristic includes applying a weight to each observed characteristic.

14. The method of claim 13, the plurality of road characteristics including a current road characteristic and a previous road characteristic, and wherein the weight applied to the current road characteristic is greater than the weight applied to the previous road characteristic.

15. The method of claim 9, wherein counting the frequency of the observed characteristic includes counting a number of times the observed characteristic changes over the predetermined period of time.

16. The method of claim 15, wherein predicting the future road characteristic is based at least in part on the number of times the observed characteristic changes over the predetermined period of time.

17. A non-transitory computer-readable medium tangibly embodying computer-executable instructions that cause a processor to execute operations comprising:
    receiving infrastructure information collected in real time;
    processing the infrastructure information;
    predicting a future road characteristic based on the infrastructure information by observing at least one of a plurality of road characteristics over a predetermined period of time, counting a number of times the at least one of a plurality of road characteristics changes over the predetermined period of time, and predicting the future road characteristic based at least in part on whether the at least one of a plurality of road characteristics is observed at least two times over the predetermined period of time and a predicted duration of the at least one of a plurality of road characteristics; and
    controlling at least one vehicle subsystem in accordance with the predicted future road characteristic.

18. The non-transitory computer-readable medium of claim 17, wherein predicting the future road characteristic includes:
    applying a weight to each observed characteristic, wherein the weight applied to a current road characteristic is greater than the weight applied to a previous road characteristic; and
    predicting the future road characteristic based at least in part on the number of times the observed characteristic changes over the predetermined period of time.

* * * * *